United States Patent
Balamane et al.

(10) Patent No.: US 8,498,182 B1
(45) Date of Patent: Jul. 30, 2013

(54) WRAP-AROUND ANTENNA DESIGN FOR IMPROVED PERFORMANCE IN THERMALLY-ASSISTED MAGNETIC RECORDING

(75) Inventors: Hamid Balamane, Portola Valley, CA (US); Jordan A. Katine, Mountain View, CA (US); Neil L. Robertson, Palo Alto, CA (US); Matteo Staffaroni, Pleasanton, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/490,283

(22) Filed: Jun. 6, 2012

(51) Int. Cl.
*G11B 11/00* (2006.01)
(52) U.S. Cl.
USPC .................... 369/13.33; 369/13.2; 369/13.02; 360/59
(58) Field of Classification Search
None
See application file for complete search history.

(56) References Cited

U.S. PATENT DOCUMENTS

| | | | |
|---|---|---|---|
| 6,999,384 B2 | 2/2006 | Stancil et al. | |
| 7,652,954 B2 | 1/2010 | Fontana, Jr. et al. | |
| 7,852,587 B2 * | 12/2010 | Albrecht et al. | 360/59 |
| 7,880,996 B2 | 2/2011 | Stipe | |
| 8,031,561 B2 * | 10/2011 | Hellwig et al. | 369/13.01 |
| 2008/0149809 A1 | 6/2008 | Hamann et al. | |
| 2008/0151360 A1 | 6/2008 | Stipe | |
| 2009/0258186 A1 | 10/2009 | Fontana, Jr. et al. | |
| 2010/0163521 A1 | 7/2010 | Balamane et al. | |
| 2010/0165499 A1 | 7/2010 | Stipe | |
| 2011/0303637 A1 | 12/2011 | Araki et al. | |
| 2013/0064514 A1 * | 3/2013 | Peng | 385/124 |

* cited by examiner

*Primary Examiner* — Muhammad N Edun
(74) *Attorney, Agent, or Firm* — Patterson & Sheridan, LLP

(57) ABSTRACT

The presented embodiments generally relate to designing an antenna of an optical transducer (e.g., a near-field transducer or near-field optical source) that focuses the optical energy of a radiation source (e.g., a laser) onto a magnetic media, thereby heating the media. Specifically, the antenna is designed to wrap-around an aperture of the optical transducer such that at least a portion of the antenna is between a main pole of a write head and a surface of the aperture that faces the main pole. Moreover, the antenna may wrap-around the aperture such that it directly contacts the main pole.

20 Claims, 7 Drawing Sheets

WRAP-AROUND ANTENNA DESIGN FOR IMPROVED PERFORMANCE IN THERMALLY-ASSISTED MAGNETIC RECORDING

BACKGROUND OF THE INVENTION

1. Field of the Invention

Embodiments of the present invention generally relate to data storage systems, and more particularly, to write heads with optical transducers for thermally assisted recording.

2. Description of the Related Art

Higher storage bit densities in magnetic media used in disk drives have reduced the size (volume) of data cells to the point where the cell dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

SUMMARY OF THE INVENTION

The present invention generally relates to a wrap-around antenna for use in an optical transducer that heats magnetic media in a disk drive.

One embodiment discloses a method of fabricating an optical transducer configured to heat a magnetic media proximate to a head of a disk drive. The method comprises depositing an antenna of the optical transducer and forming an aperture of the optical transducer such that the aperture is disposed between a first portion of the antenna and a main pole of the head. After depositing the first portion of the antenna and forming the aperture, the method includes depositing a second portion of the antenna that extends past, in a direction towards the main pole, a surface of the aperture that faces the main pole.

Another embodiment discloses a method of fabricating an optical transducer configured to heat a magnetic media proximate to a head of a disk drive. The method comprises depositing an antenna of the optical transducer and forming an aperture of the optical transducer such that the aperture is disposed between a first portion of the antenna and a main pole of the head. After depositing the first portion of the antenna and forming the aperture, the method includes depositing a second portion of the antenna that contacts the main pole.

Another embodiment discloses a head of a disk drive comprising an optical transducer configured to heat a magnetic media proximate to the head. The optical transducer comprises an antenna and an aperture that is disposed between a first portion of the antenna and a main pole of the head. A second portion of the antenna extends past, in a direction towards the main pole, a surface of the aperture that faces the main pole. The optical transducer includes an adhesion material disposed between the second portion of the antenna and the surface of the aperture that contacts both the second portion and the surface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments described herein generally relate to designing an antenna of an optical transducer (e.g., a near-field transducer or near-field optical source) that focuses the optical energy of a radiation source (e.g., a laser) onto a magnetic media, thereby heating the media. Specifically, the antenna is designed to wrap-around an aperture of the optical transducer such that at least a portion of the antenna is between a main pole of a write head and a surface of the aperture that faces the main pole. Moreover, the antenna may wrap-around the aperture such that it directly contacts the main pole.

An Exemplary TAR Hard Drive

Figure 1A:
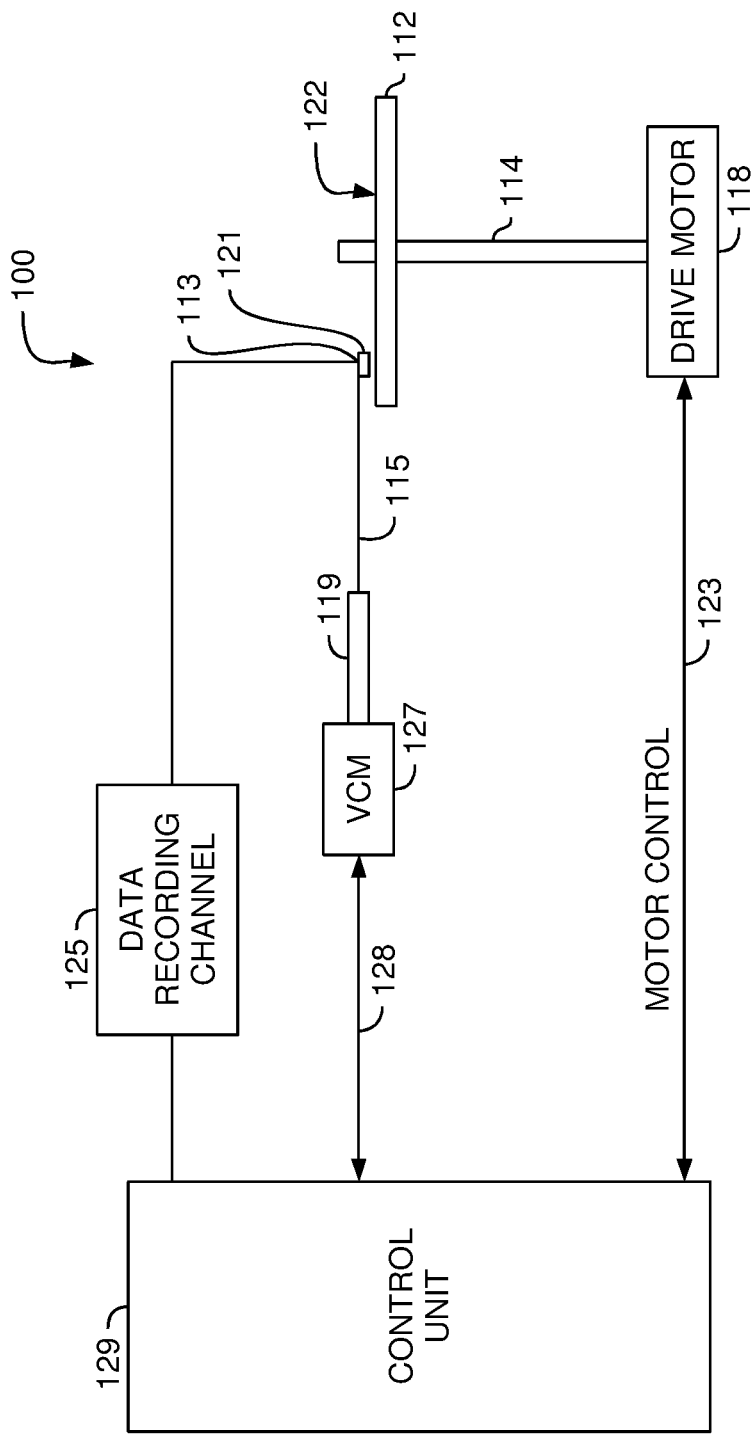
FIGS. 1A-B illustrate a disk drive system, according to embodiments described herein.

FIG. 1A illustrates a disk drive embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
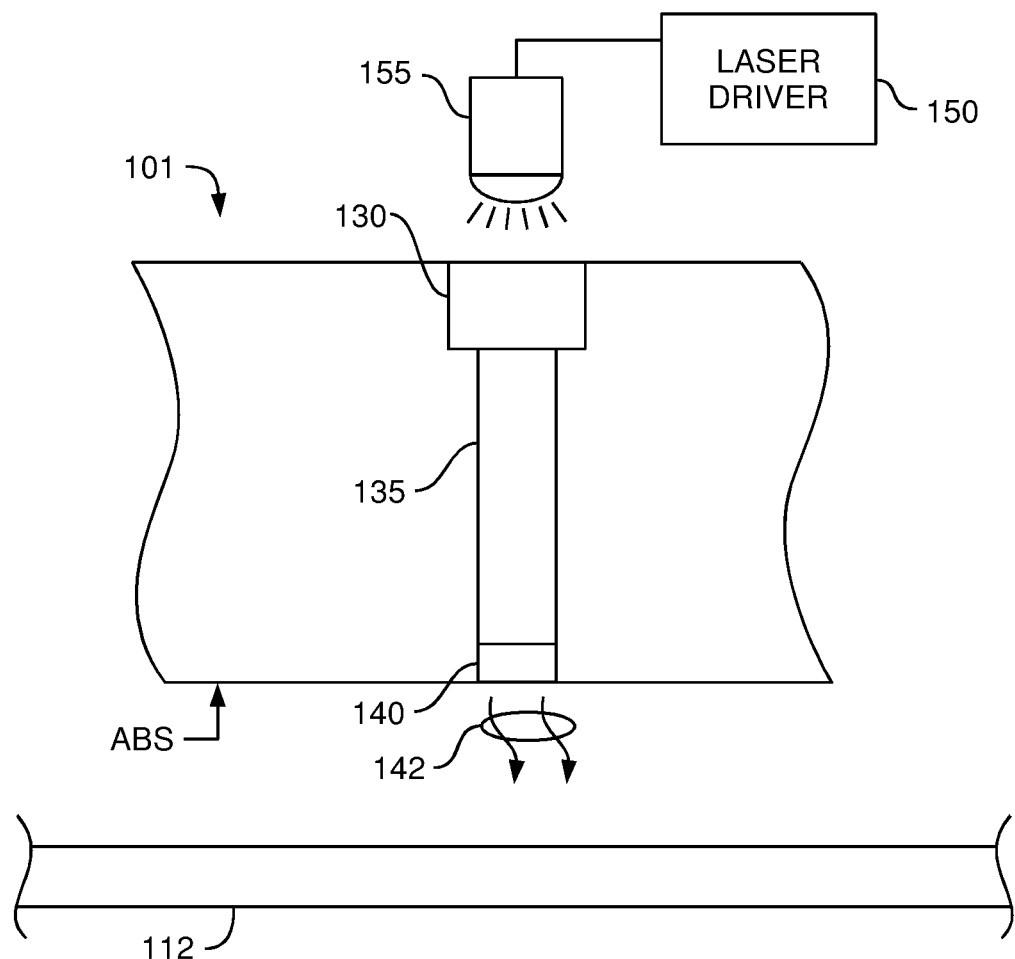

FIG. 1B is a cross sectional schematic of a TAR enabled write head 101, according to one embodiment described herein. The head 101 is operatively attached to a laser 155 (i.e., a radiation source) that is powered by a laser driver 150. The laser 155 may be placed directly on the head 101 or radiation may be delivered from a laser 155 located separate from the slider through an optical fiber or waveguide. Similarly, the laser driver 150 circuitry may be located on the slider 113 or on a system-on-chip (SOC) associated with the disk drive 100 such as the control unit 129 as shown in FIG. 1A. The head 101 includes a spot-size converter 130 for focusing the radiation transmitted by the laser 155 into the waveguide 135. In another embodiment, the head 101 may include one or more lens for focusing the beamspot of the laser 155 before the emitted radiation reaches the spot-size converter 130. The waveguide 135 is a channel that transmits the radiation through the height of the head 101 to the optical transducer 140—e.g., a plasmonic device—which is located at or near the air-bearing surface (ABS). The optical transducer 140 further focuses the beamspot to avoid heating neighboring tracks of data on the disk 112—i.e., creates a beamspot much smaller than the diffraction limit. As shown by arrows 142, this optical energy emits from the optical transducer 140 to the surface of the disk 112 below the ABS of the head 101. The embodiments herein, however, are not limited to any particular type of radiation source or technique for transferring the energy emitted from the radiation source to the ABS.

Figure 2:
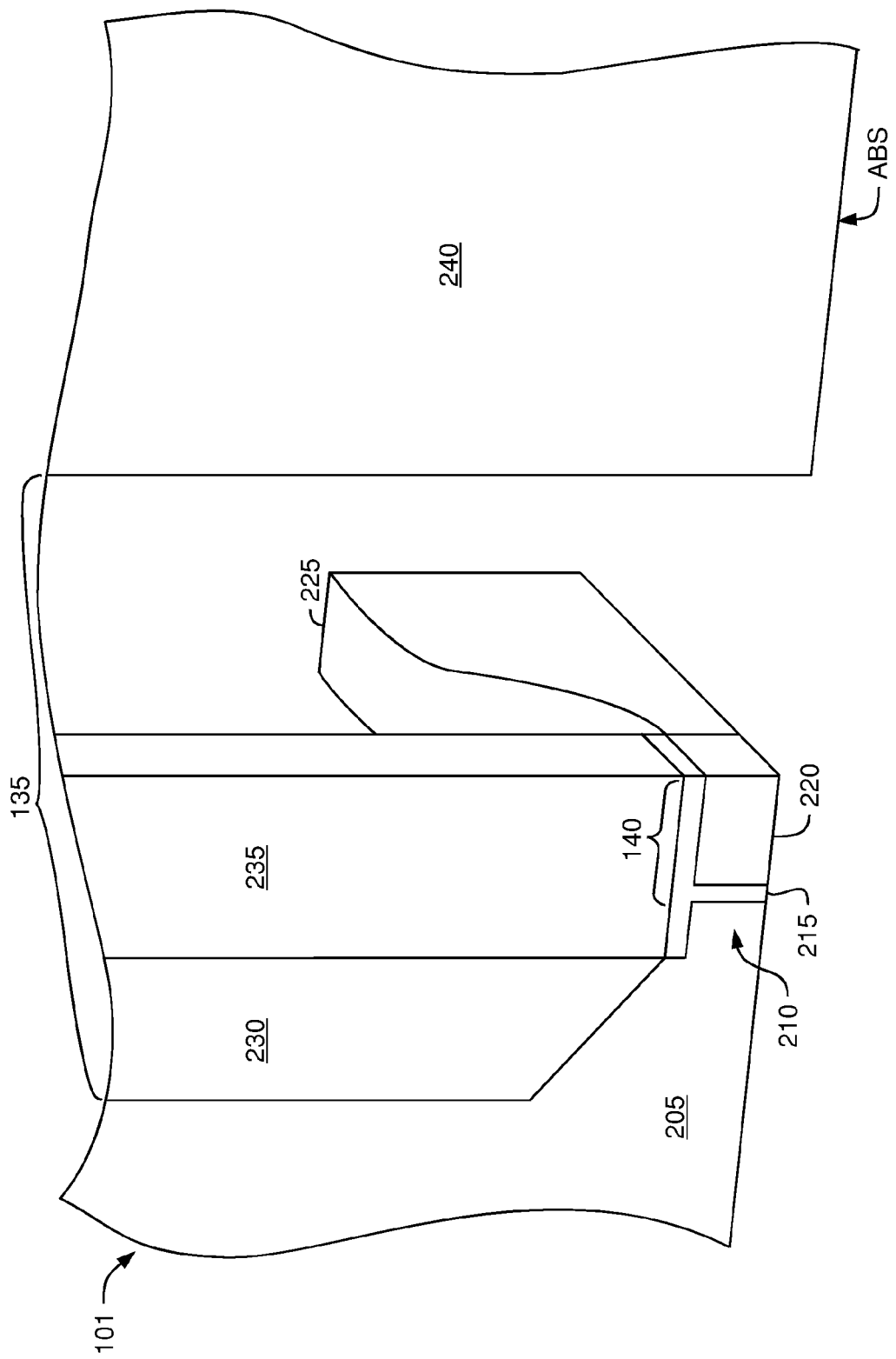
FIG. 2 illustrates a cross-sectional schematic diagram of a TAR enabled head, according to one embodiment described herein.

FIG. 2 illustrates a cross-sectional schematic diagram of a TAR enabled head 101, according to one embodiment of the invention. As shown, this portion of the head 101 includes the waveguide 135 but with some of the cladding 230 (and any cladding on the back-side of the head 101) removed to better illustrate the details of heat sink 225. The optical transducer 140 may be directly or thermally coupled to the heat sink 225 for removing excess heat from the transducer 140. Because FIG. 2 is a cross-section of head 101, there may be another heat sink located opposite the heat sink 225 depicted. The return pole 240 is located between the transducer 140 and shield layers or the read pole which are not shown in this figure.

In one embodiment, the write pole 205 includes a magnetic lip 210 portion that may extend underneath the core 235 of the waveguide 135. The magnetic flux generated by this lip 210 may aid the ability of the transducer 140 to focus the optical energy onto the magnetic media.

The core 235 (and the waveguide 135) may terminate at the optical transducer 140. The transducer 140 at least includes an antenna 220 and an aperture 215. In some embodiments, because the design and/or material of the pole lip 210 may improve the efficiency of the antenna 220, the pole lip 210 may be considered as part of the transducer 140. The antenna 325 may be Cu, Au, Ag, Rh, or alloys thereof. The aperture 215 is an opening that may be filled with radiation-transmissive material such as, for example, $SiO_2$ or other dielectric material. In one embodiment, the aperture 215 may comprise of the same material as the cladding 230. The write pole 205 and pole lip 210 may comprise of Ni, Co, Fe, or some combination or alloy thereof. The transducer 140 uses the antenna 220 and aperture 215 to further focus the optical energy delivered by the waveguide 135 onto the magnetic media.

A Wrap-Around Antenna

Figure 3A:
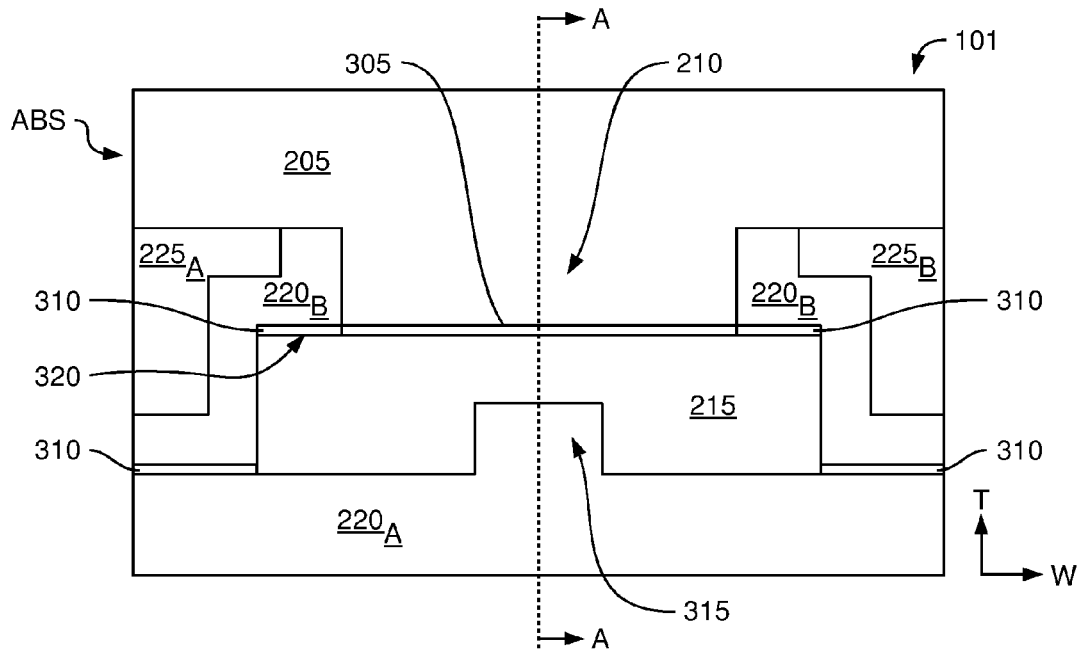
FIGS. 3A-3B are views from the air bearing surface of a write head, according to embodiments described herein.
Figure 3B:
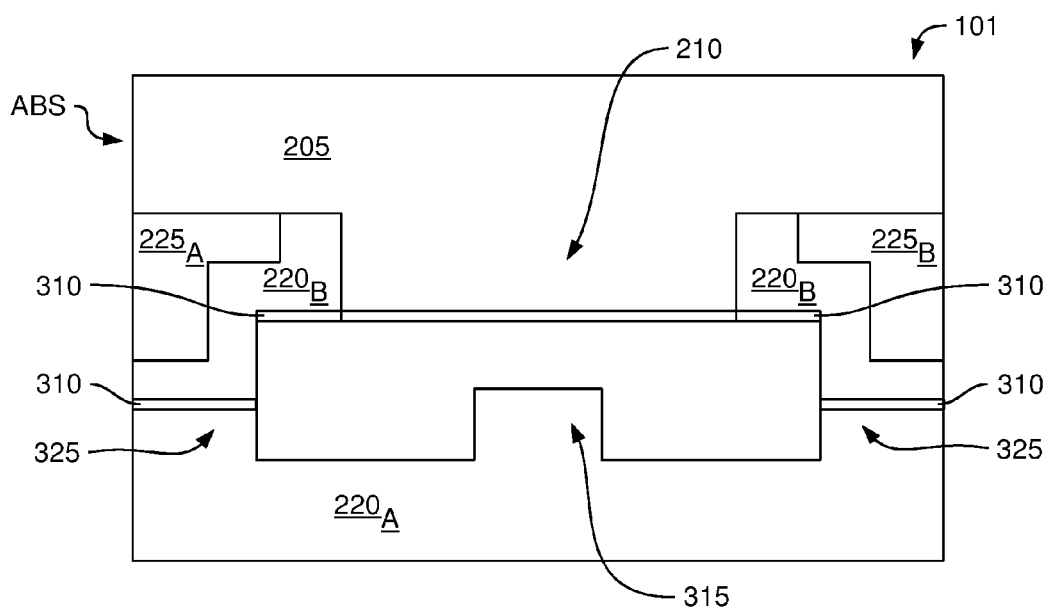

FIGS. 3A-3B are views from the ABS of a write head, according to embodiments described herein. The line A-A shown in FIG. 3A corresponds to the cross sectional view shown in FIG. 2. Further, the design shown in FIGS. 3A-3B may remain the same as the view moves away from the ABS towards a top surface of the head 101. That is, the layout may be the same as the view moves up into the head 101 until a top surface of the antenna 220 is reached.

In one embodiment, the width of the lip 210 is less than the width of the aperture 215. Advantageously, the antenna 220 is wrapped around the aperture 215 such that a portion of the antenna 220 is above the surface of the aperture 215 that is closest to the main pole 205. When the optical transducer is operating, the antenna 220 focuses the radiation traveling in the waveguide spatially into the central notch 315 of the antenna 220. Because the antenna 220 comprises a plasmonic material, the radiation causes the electrons in the antenna 220 (primarily in the central notch 315 portion) to oscillate. This plasma oscillation re-radiates the energy through the aperture 215 onto the magnetic media below the ABS.

However, plasma oscillation produces heat in the antenna 220. If the heat raises beyond a threshold temperature, or the material of the antenna 220 becomes fatigued from constant temperature fluctuations, the optical transducer may fail. The wrap-around design shown in FIGS. 3A-3B, however, may improve both the reliability of the antenna 220 and the plasmonic efficiency of the antenna. The reliability of the antenna 220 is improved by increasing the surface area of the antenna 220 as well as connecting it to the write pole 205. This connection to the write pole 205 provides another thermal channel (in addition to the heat sinks $225_{A-B}$) for dissipating the heat away from the central notch 315 where much of the electron oscillation is occurring. The plasmonic efficiency is improved by increasing the percentage of the optical energy that strikes the transducer that is then re-radiated by the antenna 220 onto the magnetic media.

Here, the antenna 220 is shown as having two portions: first portion $220_A$ and second portion $220_B$. The first portion $220_A$ and second portion $220_B$ may be deposited in two or more deposition steps which will be discussed later. The portions $220_{A-B}$ may comprise of two different materials or the same material. For example, first portion $220_A$ may be Au while the second portion $220_B$ is Rh.

Adhesion material 310 may be used to couple the high thermally conductive material of the antenna 220 to the low thermally conductive material of the aperture 215. For example, some aperture 215 materials (e.g., $SiO_2$) may not adhere well to typical antenna 220 materials (e.g., Au, Ag, Rh, etc.). Moreover, the transducer may be subject to constantly varying temperatures which causes the antenna 220 and aperture 215 to expand and contract. Because of the different thermal expansion rates of the respective materials of the antenna 220 and aperture 215, the interface between the materials may be stressed. This stress may be greater in an area where the material of the antenna 220 is deposited on top of the aperture 215—i.e., above surface 320. This stress may cause the portion of the antenna 220 contacting the top surface 320 of the aperture 215 to separate from the aperture 215, thereby decreasing the efficiency of the transducer. The adhesion material 310 may be used to ensure that the antenna 220 and the aperture 215 do not separate.

In one embodiment, the adhesion material is metallic with thermal and electrical conductivity values that are similar to the material of the antenna 220. Specifically, the adhesion material 310 may be Cr, Ta, Ti, Pd, or Si and have a thickness of 0.1-4 nm. In one embodiment, the thickness may be range from 1-2 nm. Although some of the adhesion material 310 is shown as being disposed between the first and second portions $220_{A-B}$, in one embodiment, the adhesion material 310 may be deposited only on the top surface 320 of the aperture 215 at the interface between the aperture 215 and the antenna 220. That is, the first portion $220_A$ directly contacts the second portion $220_B$ without any adhesion material in between.

A diffusion prevention layer 305 may be deposited between the main pole 205 and aperture 215. When performing TAR, the resulting heat may cause the materials of the aperture 215 to migrate into the pole lip 210. For example, migrating oxygen from a $SiO_2$ aperture 215 may oxidize the material of the main pole 205 which may decrease the write performance of the head 101. However, the diffusion prevention layer 305 can prevent the other materials besides oxygen from migrating to the main pole 205. The diffusion prevention layer 305 may be, for example, Ta, Rh, or layered combinations thereof.

FIG. 3B illustrates another embodiment of the head 101 that may be fabricated using a different process. Here, the first portion $220_A$ may include wing elements 325. The central notch 315 and the wing elements 325 of the first portion $220_A$ make what may be referred to as an "E-antenna". Depositing the first portion $220_A$, which includes the wing elements 325, may be performed in two deposition steps. In a third deposition step, the second portion $220_B$ may be added to the antenna 220 to achieve the wrap-around design. Thus, a process for making an E-antenna may be modified to achieve the wrap-around design shown here.

Figure 4A:
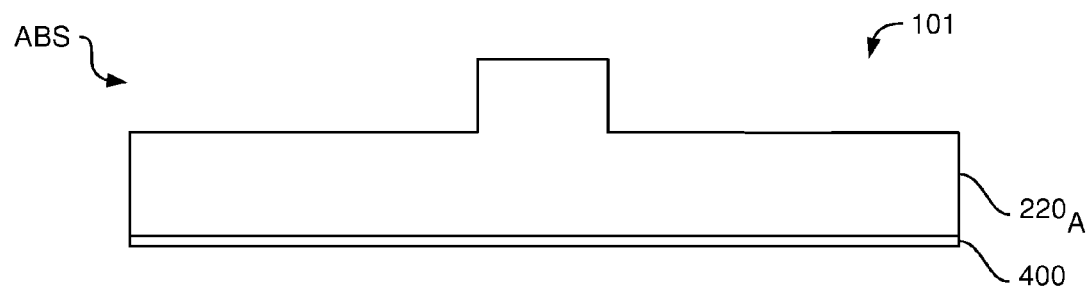
FIGS. 4A-4G illustrate the fabrication of a write head as shown in FIGS. 3A-3B, according to embodiments described herein.

FIGS. 4A-4G illustrate the fabrication of a write head as shown in FIGS. 3A-3B, according to embodiments described herein. Further, FIGS. 4A-4G illustrate a method of fabricating the head 101 from the perspective of the ABS. FIG. 4A illustrates depositing antenna material and then creating the depicted structure (i.e., the first portion $220_A$ of the antenna 220) with a central notch. The antenna 220 may comprise of any suitable material with a high thermal and electrical conductivity. The substrate 400 may include a plurality of other layers and functional elements that make up a read/write head of a disk drive.

Figure 4B:
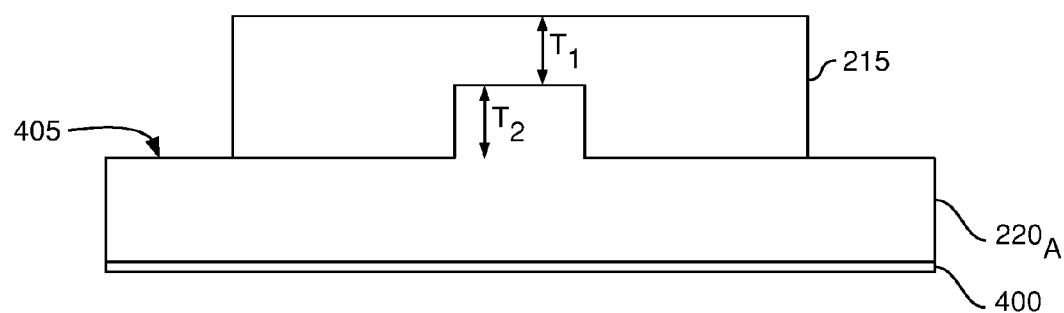

FIG. 4B illustrates depositing aperture material on top of the first portion $220_A$ of the antenna and then patterning the material to create the aperture 215. Although not shown, in one embodiment, before depositing the aperture 215, a thin layer of adhesion material may be deposited. As discussed earlier, this may lessen the stress in the interface 405 between the first portion $220_A$ of the antenna and the aperture 215. Ideally, the adhesion material may be any material that has a thermal and electrical conductivity that is similar to the conductivity of the material or materials used in the antenna 220. Materials of lower conductivity of the materials of the antenna 220 may be used but this may reduce the efficiency of the aperture 215. After depositing the aperture 215, the head 101 may be subjected to chemical-mechanical planarization (CMP) and/or reactive ion etching to achieve the desired thickness and to planarize the aperture 215. In one embodiment, the thickness ($t_1$) is between 15-50 nm and the thickness ($t_2$) is between 25-60 nm. A total thickness of the aperture 215 may be about 75 nm.

Figure 4C:
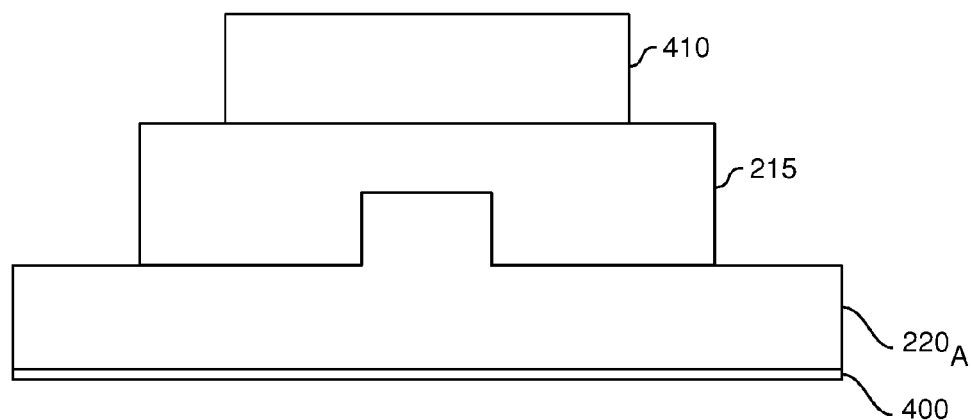

In FIG. 4C, photo resist 410 may be deposited and patterned on top of the aperture 215. In one embodiment, the photo resist 410 is capable of being removed in a lift-off process.

Figure 4D:
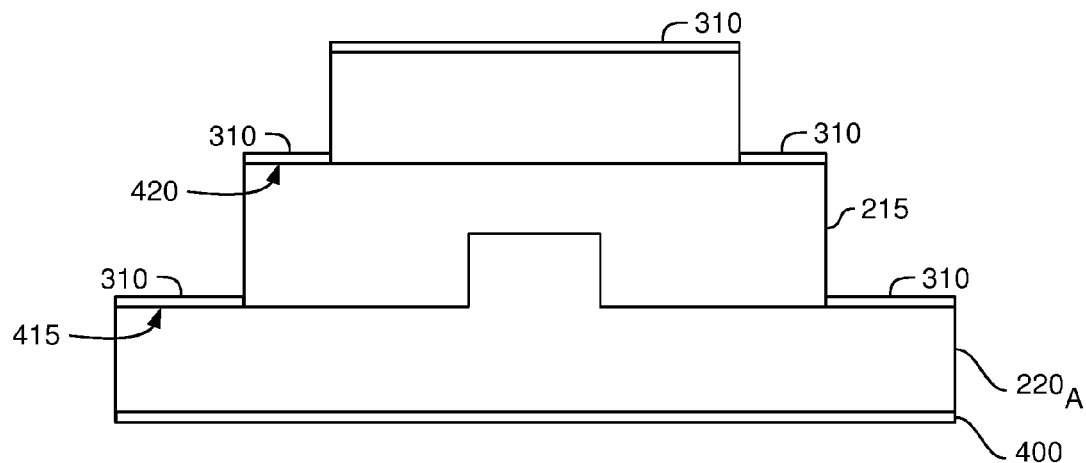

FIG. 4D illustrates depositing the adhesion material 310 at the interface 415 on the top surface of the first portion $220_A$ and at interface 420 on the top surface of the aperture 215. Although not shown, the deposition of the adhesion material 310 may be conformal such that the material 310 also covers the sides of aperture 215 in addition to interfaces 415 and 420. However, in one embodiment, additional processing steps may be performed to ensure that the adhesion material 310 is deposited only at the interface 420. For example, if the materials of the first and second portions $220_{A-B}$ of the antenna 220 have similar thermal expansion rates and sufficient intrinsic adhesion, the head may not need any adhesion material disposed between the first and second portions $220_{A-B}$ to mitigate the effects of stress caused by temperature fluctuations. Thus, an additional photo resist layer may be patterned to ensure that the adhesion material 310 is not deposited at interface 415.

Figure 4E:
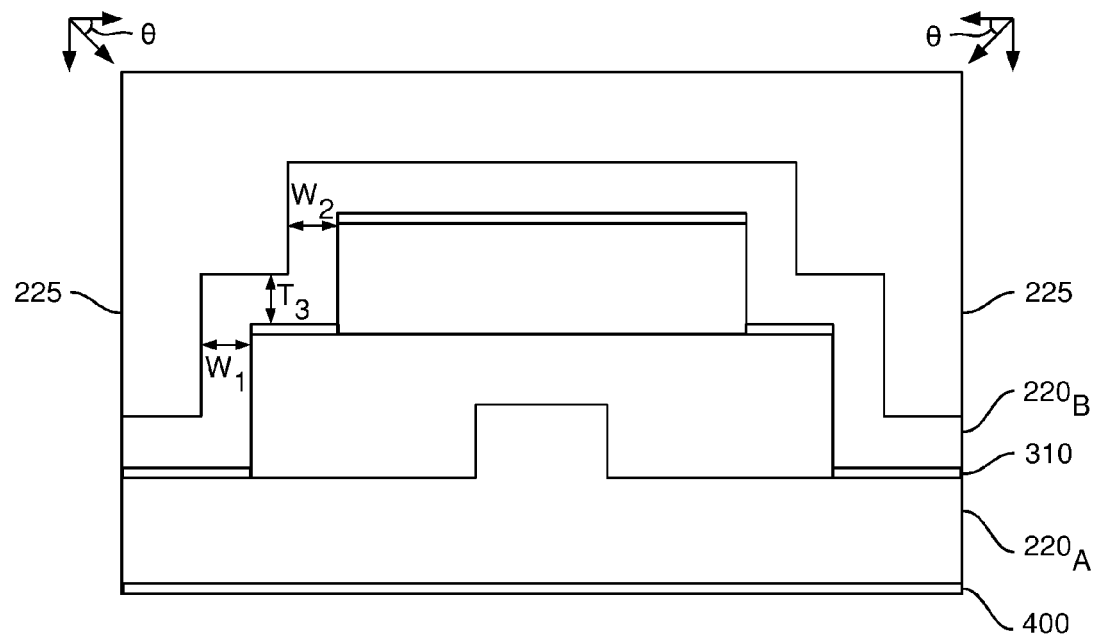

FIG. 4E illustrates depositing the second portion $220_B$ of the antenna and the heat sinks 225. Although the maximum thermal conductivity is desired, the heat sinks 225 may comprise of a material that has a lower thermal conductivity than the material of the antenna 220. In one embodiment, the material of the second portion $220_B$ may be deposited onto the substrate 400 at an angle θ. Doing so may improve the conformity of the second portion $220_B$ along the edges of the aperture 215. For example, the substrate 400 may be rotated while the second portion $220_B$ is being deposited to ensure proper conformity in all directions. In one embodiment, the angle θ is between 20-70 degrees.

Regardless of the angle used, in one embodiment, the second portion $220_B$ may be at least 30 nm thick ($t_3$) and at least 30 nm wide ($w_1$) in the area between the aperture 215 and the heat sink 225. Moreover, the second portion $220_B$ may also be at least 30 nm wide ($w_2$) in the area between the photo resist 410 (i.e., the area that will be the magnetic lip) and the heat sink 225. These dimensions ensure that the second portion $220_B$ efficiently transfers heat away from the central notch as well as increases the plasmonic efficiency of the antenna 220 when transferring optical energy onto the magnetic media.

In one embodiment, either before or after depositing the photo resist 410, wings of the antenna 220 (not shown) may be added to the first portion $220_A$. Specifically, the wings of the antenna may extend in the thickness direction to approximately the same height as the top surface of the central notch. Accordingly, after depositing the adhesion material 310 and the second portion $220_B$ of the antenna, the first portion $220_A$ is separated from the second portion $220_B$ by the adhesion material 310 as shown in FIG. 3B. In this manner, the antenna 220 may be deposited in three different deposition steps, and if desired, the antenna 220 may include three or more different materials (e.g., the first portion $220_A$ comprises Au, the wings are Ag, and the second portion $220_B$ is Rh).

Figure 4F:
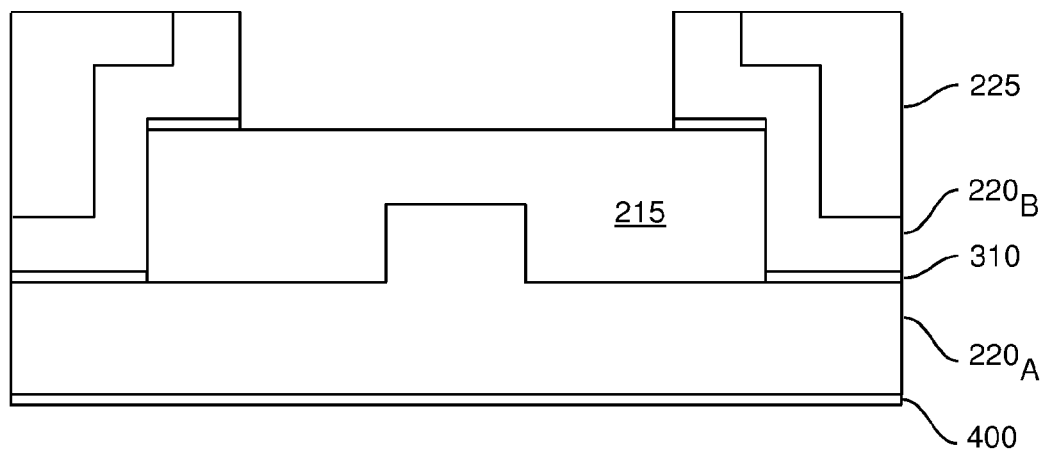

FIG. 4F illustrates removing the photo resist 410. For example, the head may be subjected to a chemical-mechanical planarization (CMP) to remove the top portion of the head. The photo resist 410 may then be removed by a solvent. Alternatively, the photo resist 410 (and the layers deposited above it) may be removed in a lift-off process.

Figure 4G:
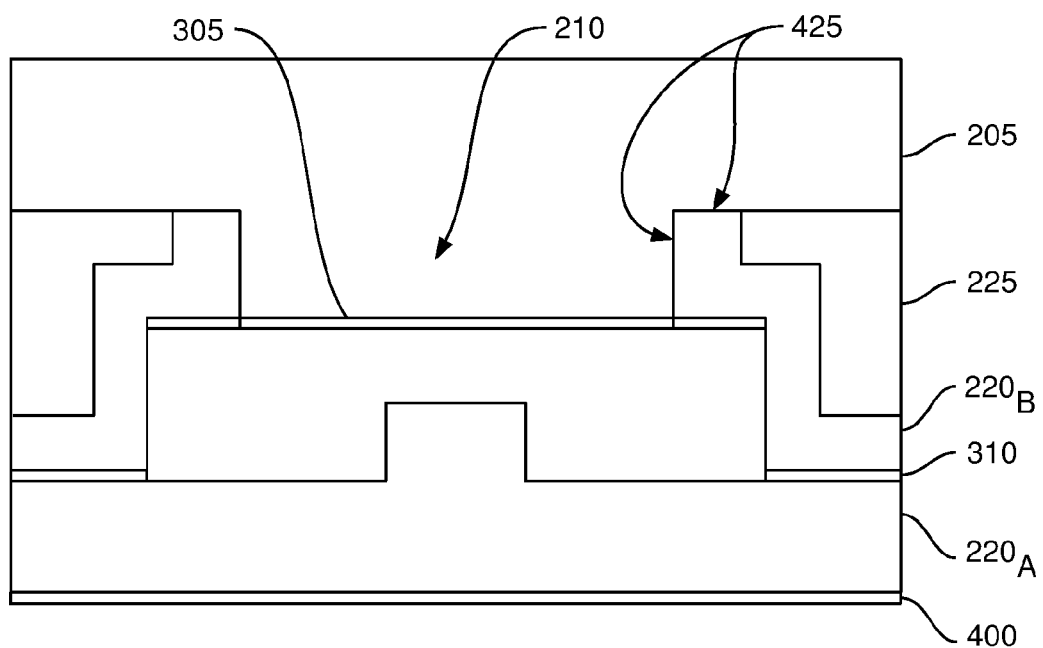

FIG. 4G illustrates depositing a diffusion layer 305 and the main pole 205 onto the head 101. The diffusion layer 305 may be deposited to prevent the material of the aperture 215 from diffusing into the material of the pole 205 which may weaken the magnetic properties of the main pole 205. After the diffusion layer 305 is deposited, the material of the main pole (e.g., Co, Ni, Fe, or an alloy thereof) is deposited into the magnetic lip 210 and on top of the planarized surface of the head 101. Selecting the width of the photo resist 410 as shown in FIG. 4C also sets the width of the lip 210. As discussed earlier, it may be advantageous to ensure that the width of the lip 210 is less than the width of the aperture 215. For example, the width of the aperture 215 may be approximately 300 nm while the width of the magnetic lip 210 may be from 150 nm to less than 300 nm.

In one embodiment, extra process steps may be performed to remove any oxides or other insulating materials that may be at the interface 425 between the second portion $220_B$ of the antenna 220 and the main pole 205. For example, the main pole 205 may be deposited by electroplating which uses a seed layer on top of the diffusion layer 310 and the planarized top surface of the head 101. However, before the electroplating can occur, the seed layer may oxidize which may result in a thin oxide layer at the interface 425. Accordingly, the interface 425 may be subjected to an oxide removal process to ensure the material of the main pole 205 directly contacts the material of the antenna 220.

Ensuring that antenna 220 directly contacts the main pole 205 (i.e., there is no thermal barrier between the two) may aid in removing thermal energy from the antenna 220. That is, the main pole 205 may act like an additional heat sink for removing the thermal energy generated in the central notch of the antenna 220 during TAR operation.

CONCLUSION

Embodiments described herein generally relate to designing an antenna of an optical transducer (e.g., a near-field transducer or near-field optical source) that focuses the optical energy of a radiation source (e.g., a laser) onto a magnetic media, thereby heating the media. Specifically, the antenna is designed to wrap-around an aperture of the optical transducer such that at least a portion of the antenna is between a main pole of a write head and a surface of the aperture that faces the main pole. Doing so, may increase the plasmonic efficiency of the transducer as well as provide additional surface area for removing heat from the antenna. Moreover, the antenna may wrap-around the aperture such that it directly contacts the main pole.

While the foregoing is directed to embodiments of the present invention, other and further embodiments of the invention may be devised without departing from the basic scope thereof, and the scope thereof is determined by the claims that follow.

What is claimed is:

1. A method of fabricating an optical transducer configured to heat a magnetic media proximate to a head of a disk drive, the method comprising:
   depositing a first portion of an antenna of the optical transducer;
   forming an aperture of the optical transducer, the aperture disposed between the first portion of the antenna and a main pole of the head; and
   after depositing the first portion of the antenna and forming the aperture, depositing a second portion of the antenna, wherein the second portion of the antenna extends past, in a direction towards the main pole, a surface of the aperture that faces the main pole.

2. The method of claim 1, wherein at least part of the second portion of the antenna is disposed between the surface of the aperture and the main pole.

3. The method of claim 1, wherein the antenna comprises at least one of Ag, Au, Rh, and alloys thereof.

4. The method of claim 1, further comprising:
   depositing an adhesion material on the surface of the aperture, wherein the adhesion material contacts both the second portion of the antenna and the surface of the aperture.

5. The method of claim 4, wherein the adhesion material does not separate the first portion of the antenna from the second portion of the antenna.

6. The method of claim 4, wherein the adhesion material is between 0.01 nm and 4 nm thick and comprises at least one of: Cr, Ta, Ti, Pd, Si, and alloys thereof.

7. The method of claim 1, further comprising forming a heat sink, wherein the second portion of the antenna is disposed between the aperture and the heat sink, and wherein a dimension of the first portion between the aperture and the heat sink is at least 30 nm.

8. The method of claim 1, wherein a material in the aperture comprises an electrically insulative and optically transparent material.

9. The method of claim 1, wherein a material of the second portion is different from a material of the first portion.

10. The method of claim 1, further comprising depositing a diffusion prevention layer directly between the aperture and the main pole.

11. A method of fabricating an optical transducer configured to heat a magnetic media proximate to a head of a disk drive, the method comprising:
depositing a first portion of an antenna of the optical transducer;
forming an aperture of the optical transducer, the aperture disposed between the first portion of the antenna and a main pole of the head; and
after depositing the first portion of the antenna and forming the aperture, depositing a second portion of the antenna, wherein the second portion contacts the main pole.

12. A head of a disk drive, comprising:
an optical transducer configured to heat a magnetic media proximate to the head, the optical transducer comprising:
an antenna;
an aperture disposed between a first portion of the antenna and a main pole of the head, wherein a second portion of the antenna extends past, in a direction towards the main pole, a surface of the aperture that faces the main pole; and
an adhesion material disposed between the second portion of the antenna and the surface of the aperture, the adhesion material contacting both the second portion and the surface.

13. The head of claim 12, wherein at least a part of the second portion of the antenna is disposed between the surface of the aperture and the main pole.

14. The head of claim 12, wherein the antenna comprises at least one of Ag, Au, Rh, and alloys thereof.

15. The head of claim 12, wherein the adhesion material is disposed between the first portion and the second portion such that both the first and second portions contact the adhesion material.

16. The head of claim 12, wherein the adhesion material does not separate the first portion of the antenna from the second portion of the antenna.

17. The head of claim 12, wherein the adhesion material is between 0.01 nm and 4 nm thick and comprises at least one of: Cr, Ta, Ti, Pd, Si, and alloys thereof.

18. The head of claim 12, further comprising a heat sink, wherein the second portion of the antenna is disposed between the aperture and the heat sink, and wherein a dimension of the first portion between the aperture and the heat sink is at least 30 nm.

19. The head of claim 12, wherein the aperture comprises an electrically insulative and optically transparent material.

20. The head of claim 12, wherein a material of the second portion is different from a material of the first portion.

* * * * *